US008194568B1

(12) United States Patent  (10) Patent No.: US 8,194,568 B1
Arnold et al.  (45) Date of Patent: Jun. 5, 2012

(54) TELECOMMUNICATIONS NETWORK TRAFFIC MONITORING

(75) Inventors: George Hutchinson Arnold, Lenexa, KS (US); Hima Diwakar Parimisetty, Overland Park, KS (US); Dahl Brougham Metters, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1351 days.

(21) Appl. No.: 11/144,434

(22) Filed: Jul. 5, 2005

(51) Int. Cl.
*H04L 12/28* (2006.01)
(52) U.S. Cl. .................. 370/254; 370/230; 370/241
(58) Field of Classification Search .................. 370/217, 370/230, 241, 254
See application file for complete search history.

(56) References Cited

U.S. PATENT DOCUMENTS

| | | | |
|---|---|---|---|
| 3,318,022 A * | 5/1967 | Dorn .............................. 434/191 |
| 4,345,116 A | 8/1982 | Ash et al. |
| 4,456,788 A * | 6/1984 | Kline et al. .................... 379/137 |
| 4,464,543 A * | 8/1984 | Kline et al. .................... 379/224 |
| 5,142,570 A * | 8/1992 | Chaudhary et al. ....... 379/221.07 |
| 5,285,494 A * | 2/1994 | Sprecher et al. .............. 455/423 |
| 5,539,815 A * | 7/1996 | Samba ...................... 379/221.07 |
| 6,639,982 B1 * | 10/2003 | Stuart et al. .............. 379/266.03 |
| 6,721,405 B1 | 4/2004 | Nolting et al. |
| 2001/0054097 A1 | 12/2001 | Chafe |
| 2003/0229613 A1 * | 12/2003 | Zargham et al. .................. 707/1 |
| 2004/0170261 A1 * | 9/2004 | Baker ....................... 379/114.01 |
| 2004/0240385 A1 * | 12/2004 | Boggs et al. ................... 370/230 |
| 2006/0034187 A1 * | 2/2006 | Pack ............................. 370/252 |
| 2007/0036077 A1 * | 2/2007 | Boggs ........................... 370/230 |
| 2007/0276693 A1 * | 11/2007 | Cox et al. .......................... 705/1 |
| 2008/0174610 A1 * | 7/2008 | Ingber et al. .................. 345/619 |

OTHER PUBLICATIONS

Natural Resources Conservation Service Global Population Density Map Sep. 8, 2003 US Department of Agriculture 1994 Edition of the World pp. 1 and 2.*
Whitman Disneyland Color by Number 1964 Disney pp. 1-76.*

* cited by examiner

*Primary Examiner* — Derrick Ferris
*Assistant Examiner* — Christopher R Crompton

(57) ABSTRACT

Blocked traffic is monitored in a telecommunications network. Respective switch data is collected from each of the switches including respective routing tables and trunk performance parameters for a current time period. Final trunk groups are identified for each respective switch in response to the respective routing tables. The number of circuits within each final trunk group is determined. The total usage of each of the final trunk groups is determined in response to the respective trunk performance parameters. A blocking value for each of the final trunk groups is determined. A network portrayal is generated wherein each of the switches is depicted according to one of a plurality of ranges of aggregate blocking values for each respective switch. A plurality of switch portrayals is generated wherein each switch portrayal depicts each final trunk group within a respective switch according to a plurality of ranges of blocking values.

18 Claims, 6 Drawing Sheets http://servicemanagement/QoS/PCS/trk/TRKHist.aspx?Switch=KansasCity_1&Trunk=PN0879

File  Edit  View  Favorites  Tools  Help

Hourly History for KansasCity_1 (Trunk PN0879) for the Past 12 hours

| Collect Period | NATTMPT | CONNECT | ANSWER | NOVFLATB | CONNECT% | ANSWER% | INCATOT | GLARE | TANDEM | TOTU | TRFU% | SBU | MBU | GOS |
|---|---|---|---|---|---|---|---|---|---|---|---|---|---|---|
| 13:30-14:00 | 7495 | 7307 | 4962 | 188 | 97.0 | 67.0 | 0 | 0 | 7 | 12463 | 96.0 | 432 | 0 | 0.0169 |
| 12:30-13:00 | 7261 | 7125 | 4959 | 136 | 98.0 | 69.0 | 0 | 0 | 5 | 12589 | 97.0 | 432 | 0 | 0.0297 |
| 12:00-12:30 | 7665 | 7430 | 5110 | 233 | 96.0 | 68.0 | 0 | 0 | 4 | 12624 | 97.0 | 432 | 0 | 0.0349 |
| 11:30-12:00 | 7163 | 7082 | 4918 | 81 | 98.0 | 69.0 | 0 | 0 | 3 | 12324 | 95.0 | 432 | 0 | 0.0092 |
| 11:00-11:30 | 7003 | 7003 | 4799 | 0 | 100.0 | 68.0 | 0 | 0 | 4 | 11277 | 87.0 | 24 | 0 | 0.0000 |
| 10:30-11:00 | 6916 | 6914 | 4768 | 2 | 99.0 | 68.0 | 0 | 0 | 0 | 11557 | 89.0 | 0 | 0 | 0.0002 |
| 10:00-10:30 | 6160 | 6159 | 4278 | 0 | 99.0 | 69.0 | 0 | 0 | 5 | 10624 | 81.0 | 0 | 0 | 0.0000 |
| 09:30-10:00 | 5621 | 5621 | 3846 | 0 | 100.0 | 68.0 | 0 | 0 | 4 | 9822 | 75.0 | 0 | 0 | 0.0000 |
| 09:00-09:30 | 5277 | 5277 | 3719 | 0 | 100.0 | 70.0 | 0 | 0 | 3 | 9115 | 70.0 | 0 | 0 | 0.0000 |
| 08:30-09:00 | 4949 | 4949 | 3552 | 0 | 100.0 | 71.0 | 0 | 0 | 2 | 6991 | 69.0 | 0 | 0 | 0.0000 |
| 08:00-08:30 | 4415 | 4414 | 3043 | 0 | 99.0 | 68.0 | 0 | 0 | 0 | 7761 | 59.0 | 0 | 0 | 0.0000 |
| 07:30-08:00 | 3415 | 3415 | 2508 | 0 | 100.0 | 73.0 | 0 | 0 | 4 | 6235 | 48.0 | 0 | 0 | 0.0000 |
| 07:00-07:30 | 2142 | 2142 | 1591 | 0 | 100.0 | 74.0 | 0 | 0 | 0 | 3756 | 28.0 | 0 | 0 | 0.0000 |
| 06:30-07:00 | 1296 | 1296 | 975 | 0 | 100.0 | 75.0 | 0 | 0 | 0 | 2389 | 18.0 | 0 | 0 | 0.0000 |
| 06:00-06:30 | 690 | 689 | 502 | 0 | 99.0 | 72.0 | 0 | 0 | 0 | 1332 | 10.0 | 0 | 0 | 0.0000 |
| 05:30-06:00 | 401 | 401 | 271 | 0 | 100.0 | 67.0 | 0 | 0 | 0 | 786 | 6.0 | 0 | 0 | 0.0000 |
| 05:00-05:30 | 216 | 216 | 151 | 0 | 100.0 | 69.0 | 0 | 0 | 0 | 579 | 4.0 | 0 | 0 | 0.0000 |
| 04:30-05:00 | 197 | 197 | 116 | 0 | 100.0 | 58.0 | 0 | 0 | 1 | 551 | 4.0 | 0 | 0 | 0.0000 |
| 04:00-04:30 | 164 | 164 | 103 | 0 | 100.0 | 62.0 | 0 | 0 | 0 | 564 | 4.0 | 0 | 0 | 0.0000 |
| 03:30-04:00 | 146 | 146 | 77 | 0 | 100.0 | 52.0 | 0 | 0 | 0 | 667 | 5.0 | 0 | 0 | 0.0000 |
| 03:00-03:30 | 260 | 260 | 159 | 0 | 100.0 | 61.0 | 0 | 0 | 0 | 973 | 7.0 | 0 | 0 | 0.0000 |

TELECOMMUNICATIONS NETWORK TRAFFIC MONITORING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to telecommunications traffic monitoring, and, more specifically, to a tool for assisting network monitoring personnel to assess traffic blockage for a plurality of switches in the network.

Telecommunications systems such as the public switched telephone network and cellular wireless networks include switches for forwarding traffic to the appropriate destinations. The communication channels for carrying traffic between switches are known as trunks. Trunks may interconnect switches to other switches or to other traffic nodes such as a base station controller in a wireless cellular system.

Trunks are also sometimes referred to as circuits. As used herein, trunk refers to any single transmission channel between two points. A trunk group is one or more trunks that connect the same two points (e.g., switches or nodes) and are connected in such a way that if a call is routed to the trunk group and a free circuit is available in the trunk group, then the call will be routed on the free circuit. The trunk groups included in a network are laid out between the switches and nodes in a quantity that provides the capacity needed to optimally handle traffic loads experienced within the network. A control center is provided within the telecommunications network for monitoring network elements (e.g., detecting failures of switches and trunks) and managing network performance.

In order to assist in handling variable traffic loads between origination and destination switches for all the simultaneous calls being forwarded within the network, alternate routes are established between the pairs of switches. Typically, each separate route from one switch to another switch is defined according to a hierarchy of trunk groups leading from an origination switch that may be used to establish a connection to the destination switch (possibly via an intermediate switch). This hierarchy is stored in a routing table. A higher priority trunk group (e.g., a trunk group providing a direct connection to the destination) is listed first in the routing table. When attempting to establish a connection for a new call, if the higher priority trunk group does not have a free circuit then lower priority trunk groups are sequentially identified until either a free circuit is found or until a final trunk group in the routing table has been checked. If the final trunk group cannot provide a free circuit, then the call is blocked.

Excessive call blockage must be detected at the control center so that changes in the network configuration can be made to reduce blockage. Switches compile performance data continuously during their operation and the control center collects the data periodically for analysis. In addition, alarm messages are sent by the switches upon the occurrence of certain failures or conditions. Due to the large amount of data that is accumulated at the control center for analysis, detection of specific blockage issues is difficult and time consuming. Furthermore, a certain amount of blocked calls are always present and are not necessarily an indication of a significant traffic issue. Therefore, it would be desirable to provide a data analysis tool that can better identify traffic problems that need attention of the control center technicians.

SUMMARY OF THE INVENTION

The present invention has the advantage of improving the detection of excessive call blockage and presenting information in a user-friendly and efficient manner. To reduce the data to be analyzed, the invention collects data from final truck groups since only calls blocked at a final trunk group correspond to a customer not being able to complete a call.

In one aspect of the invention, a method is provided for monitoring blocked traffic in a telecommunications network including a plurality of switches interconnected by a plurality of trunk groups. Respective switch data is collected from each of the switches including respective routing tables and trunk performance parameters for a current time period. Final trunk groups are identified for each respective switch in response to the respective routing tables. The number of circuits within each final trunk group is determined. The total usage of each of the final trunk groups is determined in response to the respective trunk performance parameters. A blocking value for each of the final trunk groups is determined. A network portrayal is generated wherein each of the switches is depicted according to one of a plurality of ranges of aggregate blocking values for each respective switch. A plurality of switch portrayals are generated wherein each switch portrayal depicts each final trunk group within a respective switch according to a plurality of ranges of blocking values. A technician determines whether significant problems exist by inspecting the portrayals.

BRIEF DESCRIPTION OF THE DRAWINGS

FIG. 6 is a screen shot showing a web page of the present invention including a history portrayal for a selected final trunk group.

DETAILED DESCRIPTION OF PREFERRED EMBODIMENTS

Figure 1:
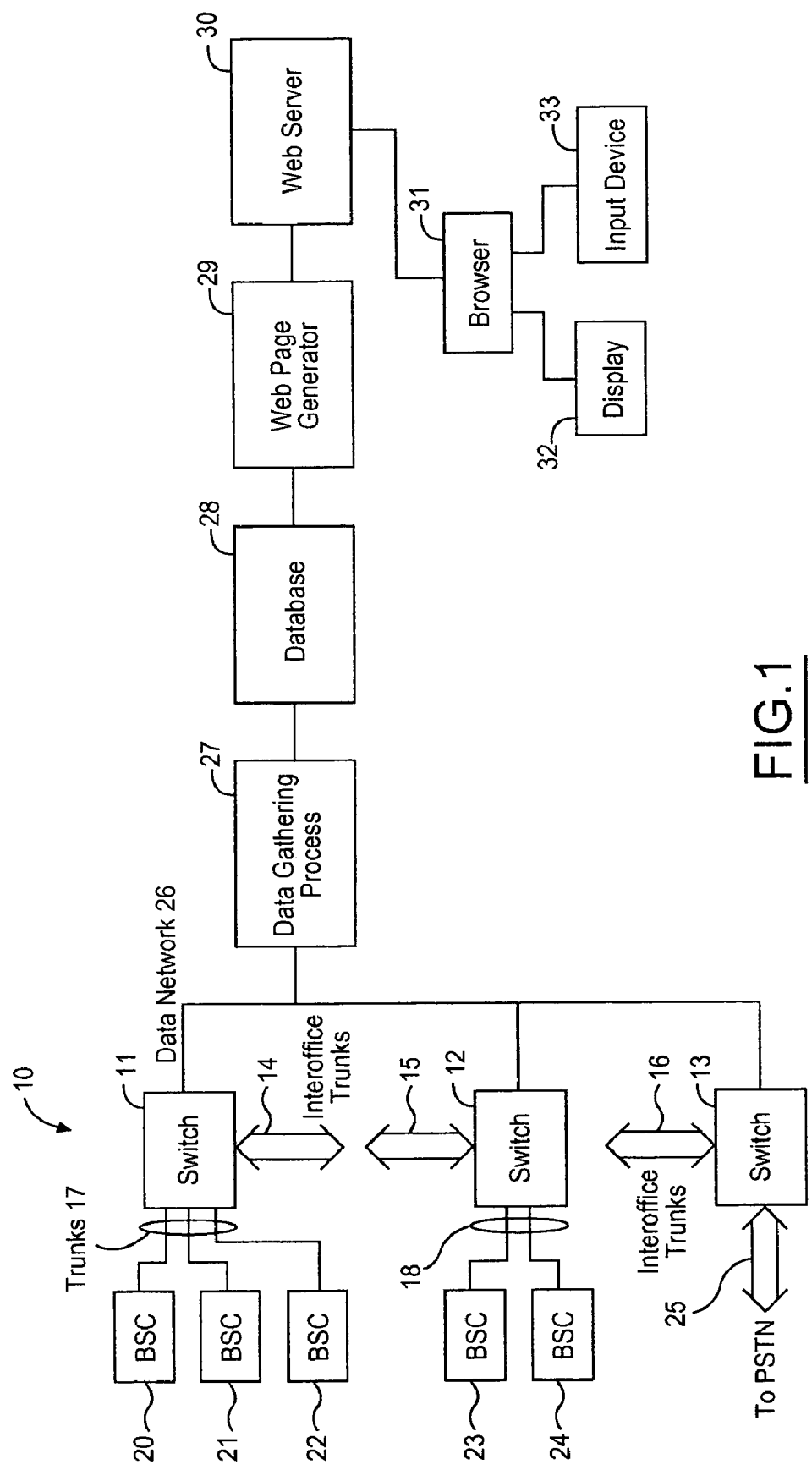
FIG. 1 is a is a block diagram of a telecommunications system according to the present invention.

Referring to FIG. 1, a telecommunications network 10 includes switches 11, 12, and 13. Switches 11-13 are interconnected by interoffice trunks 14, 15, and 16. Switches 11 and 12 may be comprised of mobile switching offices (MSOs) and be connected by trunks 17 and 18 to base station controllers (BSCs) 20-24, for example. Switch 13 may be a central office in the public switched telephone network (PSTN) and be connected to other switches or nodes in the PSTN by other trunk circuits 25.

Switches 11-13 are also interconnected by a data network 26 as part of an operational support system which may be managed from a control center (not shown). A data gathering process 27 is connected to all the network switches over data network 26 for gathering operational measurements that the switches automatically retain and then storing the collected measurements in a database 28. Other descriptive data and configuration data such as routing tables are also collected and stored. A web page generator 29 is connected to database 28 for generating web pages that are stored on a web server 30 for access via a browser 31. A user (e.g., a technician in a control center) interacts with browser 31 via a display 32 and an input device 33 (such as a keyboard and mouse) to check on the final trunk group-based information for all switches on the network, thereby allowing technicians to detect problems and to concentrate their efforts on the most significant problems that may exist.

Data gathering process 27 uses known techniques (e.g., switch manufacturer-specific) in order to collect switch data that is conventionally maintained by the switches and accessible using known network protocols. For each final trunk group connected to a switch, the switch maintains a performance measurement for trunk usage (e.g., in centum call seconds) and the number of circuits operating. Other switch data that is be gathered preferably includes routing tables, call attempts, call connection rate (CCR), and answer to seizure ratio (ASR), as well as trunk oriented performance parameters such as number of trunks in a trunk group, number of call attempts directed to a trunk group, a number of overflows, a CCR, an ASR, system busy units (SBU), and manual busy units (MBU). Performance parameters are typically reported for a current time period such as the previous half-hour. Web page generator 29 processes the data stored in database 28 and generates web pages for displaying traffic health analysis in a user friendly display allowing a technician to identify problems with a quick visual inspection.

Figure 2:
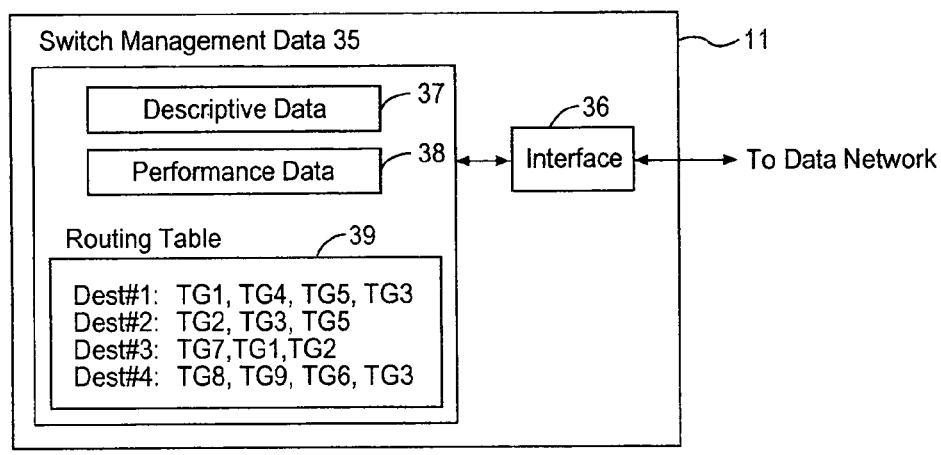
FIG. 2 is a block diagram showing certain elements of a switch.

FIG. 2 is a block diagram showing certain elements of switch 11 in greater detail. A switch management data block 35 is coupled to the data network via an interface 36. The switch management data includes descriptive data 37, performance data 38, and a routing table 39, which may all be accessed as part of the data gathering process via the data network. Descriptive data 37 may include switch identifiers and configuration information, such as the number of trunk circuits in each trunk group, for example. Performance data includes call usage information such as hundred call seconds or CCS for each trunk group during at least the current measuring period (e.g., previous half hour). Routing table 39 includes entries for identifying a ranked order of trunk groups for reaching respective destinations. For example, a destination #1 is reached from switch 11 according to a progression of trunk groups in the order of trunk group TG1 to TG4 to TG5 and to TG3 (with TG3 being the final trunk group). When a call connection attempt is made to destination #1, the switch attempts to use trunk groups in that order and if a failure to find a free trunk occurs when directed to trunk group TG3, then the call is finally blocked.

Figure 3:
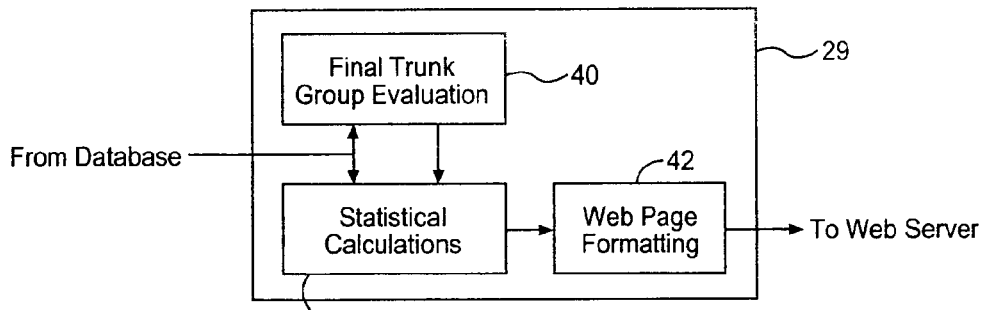
FIG. 3 is a block diagram showing a web page generator of the present invention in greater detail.

FIG. 3 shows web page generator 29 in greater detail. A final trunk group evaluation block 40 receives each routing table from database 28 and determines the identities of final trunk groups for each switch based on the routing table configurations. Preferably, the routing tables are automatically inspected to identify actual final trunk groups rather than accepting some other manually compiled list of intended final trunk groups because of potential errors in data entry when creating the routing tables. Based on the identities of the final trunk groups from block 40, statistical calculations are carried out in block 41 using the performance data collected into the database for each final trunk group. The gathered data includes traffic usage by final trunk group, the number of circuits assigned to each final trunk group, and the number of circuits actually in service in each final trunk group. Based on the number of circuits and the call usage in hundred call seconds (CCS), the statistical calculations 41 include a reverse look-up in an Erlang-B table to determine the amount of call blocking. As is known in the art, Erlang-B tables list the probability of a call being blocked based on the number of circuits and the offered traffic (where offered traffic equals the number of call attempts times the average holding time). Since carried traffic is equal to offered traffic minus the blocked traffic, the amount of blocked traffic (i.e., a blocking value) can be determined based on knowledge of the offered traffic (i.e., number of circuits) and the carried traffic (i.e., usage). Based on the calculations, a result table may preferably be built by block 41 for each switch in the network and for each final trunk group on each switch that shows the amount of blocked traffic (i.e., grade of service). Using the statistical calculations and other data, web page generator 29 generates corresponding web pages in a web page formatting block 42. Web pages are formatted including certain portrayals of the switch and final trunk group data to facilitate identification of call blocking issues.

Figure 4:
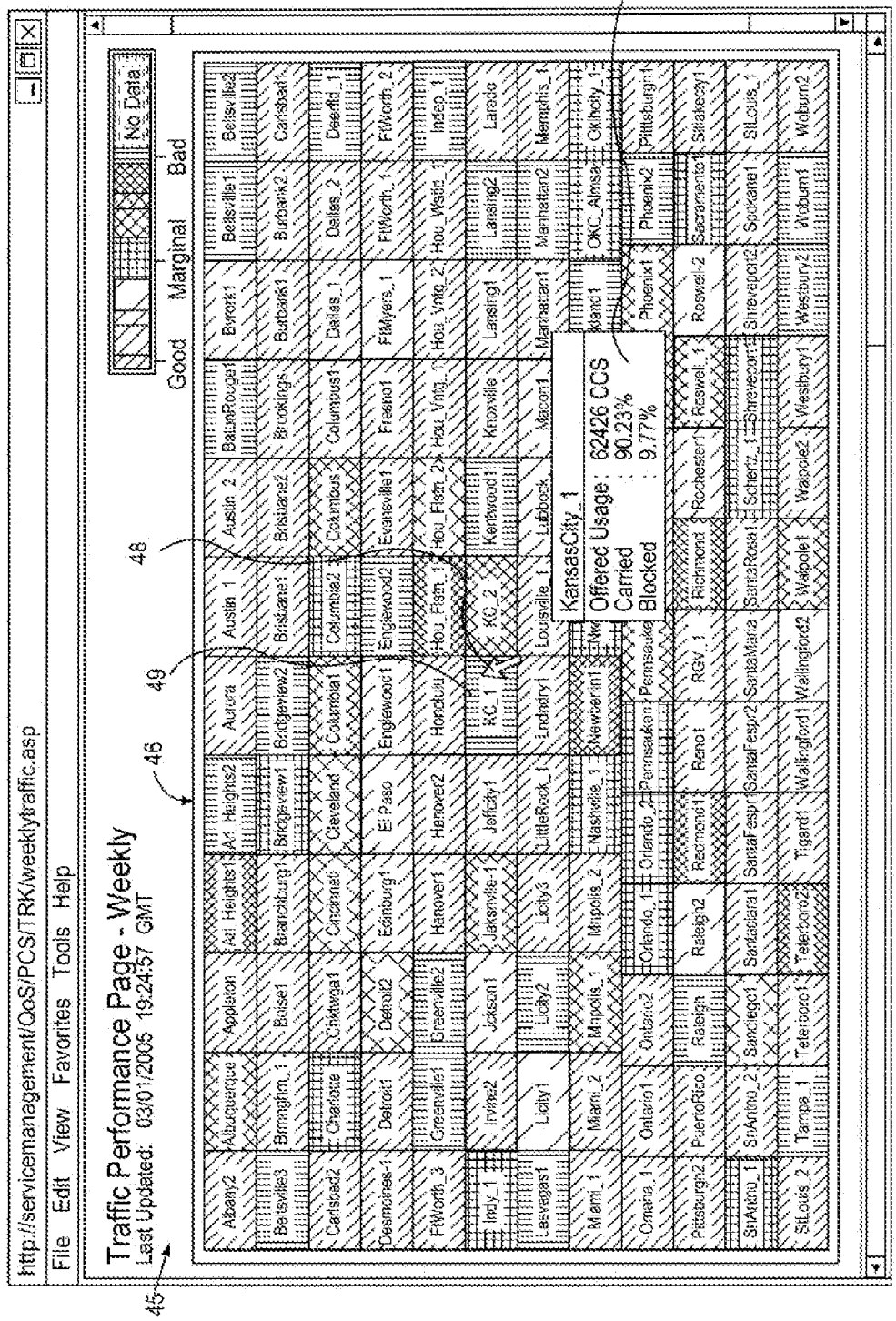
FIG. 4 is a screen shot showing a web page of the present invention including a network portrayal.

FIG. 4 shows a first web page 45 including a network portrayal 46 of all switches wherein each switch is depicted according to a plurality of ranges of aggregate blocking values. Each graphic element within a grid corresponds to a respective switch. In a preferred embodiment, network portrayal 46 highlights those switches having traffic problems using a predetermined color scheme. Preferably, graphic elements representing switches with no blockage or little blockage are shown in shades of green, switches with marginal blockage are shown as yellow, and switches with significant call blockage are shown in shades of orange to red. A graphic elements for a switch having no data may be shown in gray. Each graphic element is preferably shaped as a rectangle including a name identifier of the respective switch.

The call blocking value for each switch shown in FIG. 4 is an aggregate blocking value for all the final trunk groups of the switch. Predetermined ranges of blocking values are mapped to respective colors to best differentiate performance levels in view of the size, complexity, and performance goals of a particular network. Because of wide variations in offered traffic, the web page display in FIG. 4 preferably corresponds to the worst performance of each switch over a particular time span, such as the previous week. Thus, database entries are maintained for each switch to provide historical data for the previous week. As new data is collected periodically (e.g., each half-hour or each one-hour), data older than the selected time span may be discarded from memory. Data for the complete time span is searched and the worst performance of the switch identified is used to generate network portrayal 46.

Additional switch specific information is made available to a user browsing the web page by hovering the mouse pointer over a particular switch. A pop-up window 47 is produced when mouse pointer 48 is placed over a switch graphic element 49. Pop-up window 47 preferably displays the specific information used in selecting the color for the corresponding switch icon, namely offered usage, carried percentage, and blocked percentage. These are aggregate values.

Figure 5:
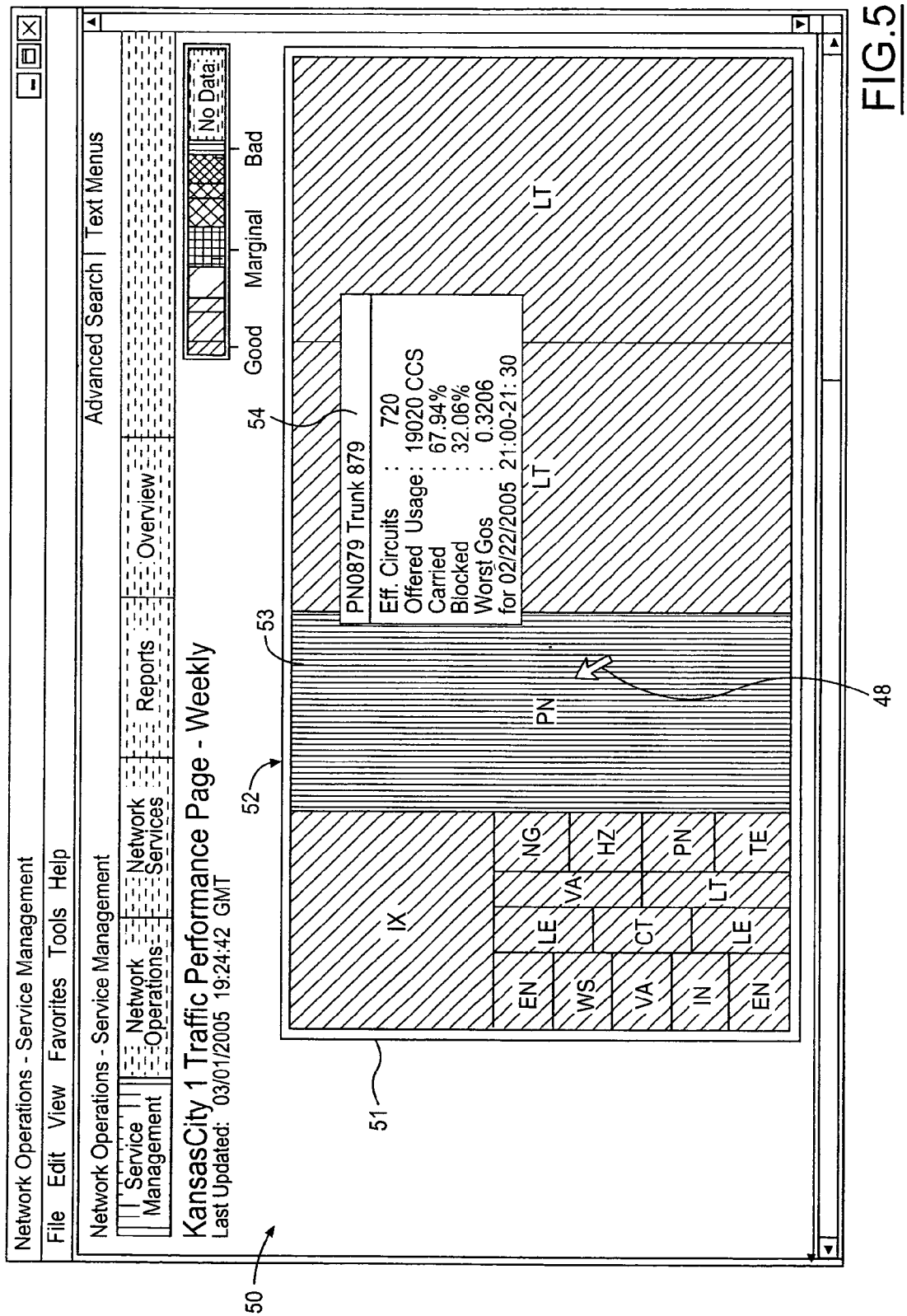
FIG. 5 is a screen shot showing a web page of the invention including a switch portrayal.

If a user clicks the mouse on a particular switch icon, a second web page 50 is loaded into the browser as shown in FIG. 5 to represent final trunk group information for the selected switch. Web page 50 includes a switch portrayal 51 including a graphic element 52 representing each final trunk group of the switch. The size of each trunk group graphic element is proportional to the number of circuits in the trunk group. The color of each trunk group graphic element indicates the severity of traffic blockage for the respective trunk group. Thus, the color of each trunk group in the switch portrayal depicts each final trunk group according to a plurality of ranges of blocking values. Once again, green represents little blockage while red indicates significant blocking values. Mouse pointer 48 is shown hovering over a trunk group 53 and invoking a pop-up box 54 displaying trunk specific data. Pop-up box 54 shows the effective number of circuits, offered usage, carried percentage, blocked percentage, worst grade of service, and a date and time identification for when the worst grade of service performance was experienced.

By clicking the mouse pointer over a particular trunk group, a trunk group history portrayal 55 is uploaded to the browser as shown in FIG. 6. Thus, a history table is shown of all relevant trunk group performance measurements and statistics for each measurement time period over a preceding time span in window 55.

A listing similar to that shown in FIG. 6 may also be obtained which includes a worst trunk group portrayal by selecting a link on the first web page (not shown). The worst trunk group portrayal lists a plurality of final trunk groups having the highest blocking percentage during the previous one-week time span regardless of which switches the trunk group connects to. For example, the worst trunk group portrayal may list the top 100 worst trunk groups in the network in order of the number of blocked calls. Traffic managers can inspect this table to prioritize work in clearing traffic issues.

Figure 7:
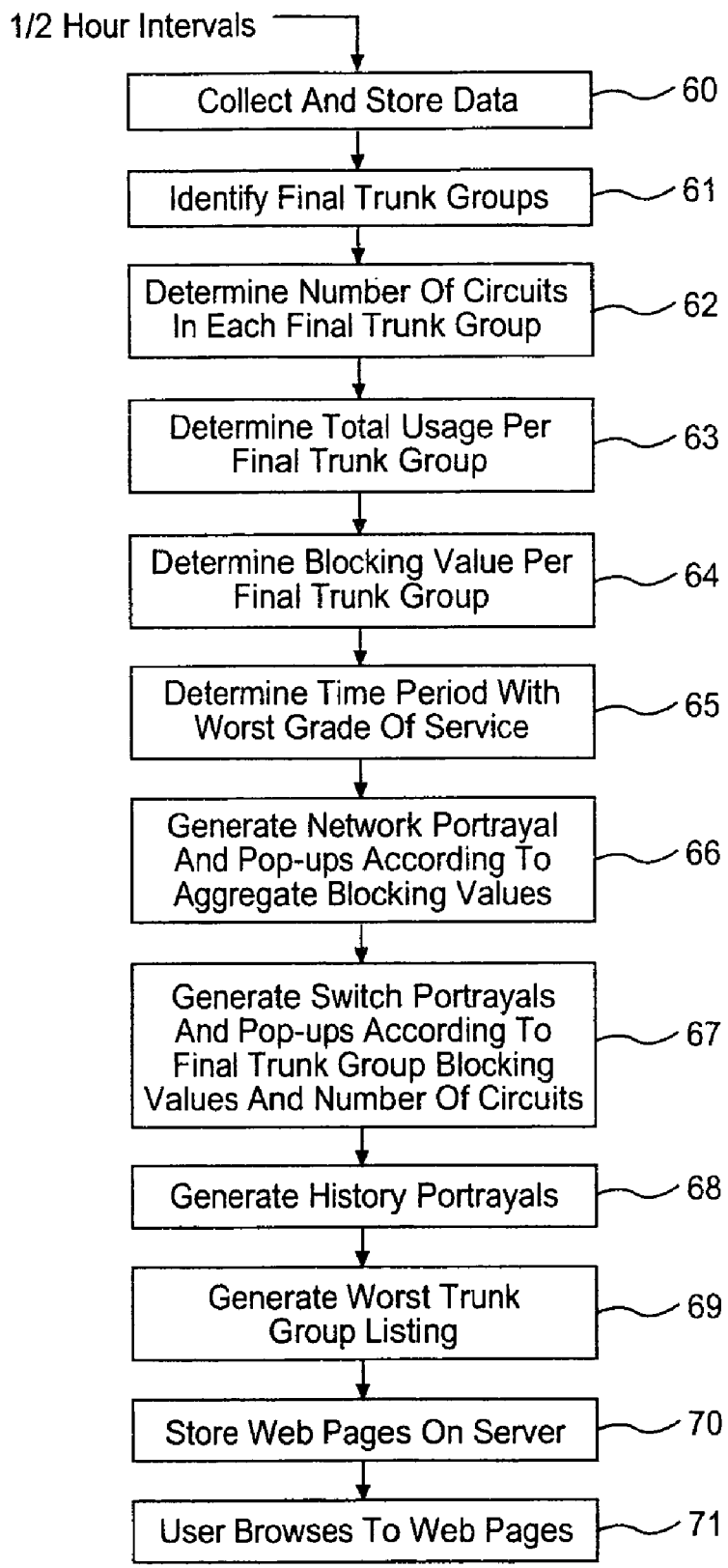
FIG. 7 is a flowchart showing a preferred method of the invention.

FIG. 7 shows a preferred method of the present invention wherein data is gathered in half-hour intervals. Thus, data is collected and stored in step 60. Final trunk groups are identified in step 61 by inspecting routing tables and identifying the last trunk group in each hierarchical list. The number of circuits in each final trunk group is determined in step 62 and the total usage for each final trunk group is determined in step 63. A blocking value for each final trunk group is determined in step 64 based on Erlang-B table look-ups as described above.

In step 65, the time period within the predetermined time span (e.g., the previous one week) having the worst grade of service is determined. The network portrayal and pop-ups are generated in step 66 according to the aggregate blocking values for final trunk groups within each respective switch.

Switch portrayals and pop-ups are generated in step 67 according to final trunk group blocking values and the number of circuits within each final trunk group. History portrayals for each final trunk group are generated in step 68 and the worst trunk group listing for the corresponding portrayal is generated in step 69. The corresponding web pages are stored on the web server in step 70 and a user browses to the web pages in step 71.

What is claimed is:

1. A method of monitoring blocked traffic in a telecommunications network including a plurality of switches interconnected by a plurality of trunk groups, said method comprising the steps of:
  collecting respective switch data from each of said switches including respective routing tables and trunk performance parameters for a current time period;
  identifying final trunk groups for each respective switch in response to said respective routing tables;
  determining a number of circuits within each final trunk group;
  determining total usage of each of said final trunk groups in response to said respective trunk performance parameters;
  determining a blocking value for each of said final trunk groups; generating a network portrayal wherein each of said switches is depicted by a respective graphic element having a respective non-alphanumeric characteristic for identifying one of a plurality of ranges of aggregate blocking values for each respective switch;
  storing a history of said blocking values;
  generating a plurality of switch portrayals wherein each switch portrayal depicts each final trunk group within a respective switch by a respective graphic element having a respective non-alphanumeric characteristic for identifying a respective one of a plurality of ranges of blocking values;
  displaying the network portrayal and switch portrayals on a display screen,
  wherein said portrayals represent a time period having a worst grade of service within a predetermined time span; and
  generating a worst trunk group portrayal listing a plurality of final trunk groups having a highest blocking percentage of all final trunk groups during said predetermined time span.

2. The method of claim 1 wherein said plurality of switch portrayals further depict a number of trunk circuits present in each of said final trunk groups.

3. The method of claim 1 wherein said trunk performance parameters are comprised of centum call seconds (CCS) and said number of circuits.

4. The method of claim 1 wherein said predetermined time span is a previous one week.

5. The method of claim 1 further comprising the step of:
  generating a trunk group history portrayal for each of said final trunk groups depicting a history of trunk performance parameters over said predetermined time span.

6. The method of claim 1 wherein said portrayals are comprised of web page graphic elements stored on a web server.

7. The method of claim 6 wherein the respective non-alphanumeric characteristic for depicting said ranges of blocking values for said switches in the network portrayal is comprised of respective colors of said graphic elements.

8. The method of claim 6 wherein each switch portrayal depicts said numbers of circuits within each final trunk group according to the respective sizes given to said graphic elements.

9. The method of claim 6 further comprising the step of:
  displaying said graphic elements to a user as a web page in response to browsing initiated by said user.

10. The method of claim 9 further comprising the step of:
  displaying a first pop-up text box in response to a user selection of a switch in said network portrayal, said first pop-up text box displaying switch summary data.

11. The method of claim 10 wherein said switch summary data comprises offered usage, carried percentage, and blocked percentage.

12. The method of claim 9 further comprising the step of:
  displaying a second pop-up text box in response to a user selection of a final trunk group in one of said switch portrayals, said second pop-up text box displaying final trunk group summary data.

13. The method of claim 12 wherein said final trunk group summary data is selected from a group comprising number of circuits, offered usage, carried percentage, blocked percentage, worst grade of service, and a time period coinciding with said worst grade of service.

14. The method of claim 1 wherein said current time period is a previous half hour.

15. The method of claim 1 wherein said plurality of switches are comprised of mobile switches connected to a wireless cellular network.

16. A blocked traffic monitoring system for a telecommunications network wherein said network includes a plurality of switches connected to a plurality of trunk groups and wherein said switches are coupled to a data network, said system comprising:
- a data gathering application for coupling to said switches via said data network for gathering switch data from each respective switch including respective routing tables and trunk performance parameters for a current time period;
- a web page generator coupled to said data gathering application for identifying final trunk groups for each respective switch in response to said respective routing tables, determining a number of circuits within each final trunk group, determining total usage of each of said final trunk groups in response to said respective trunk performance parameters, determining a blocking value for each of said final trunk groups, generating a network portrayal wherein each of said switches is depicted by a respective graphic element having a respective non-alphanumeric characteristic for identifying one of a plurality of ranges of aggregate blocking values for each respective switch, and generating a plurality of switch portrayals wherein each switch portrayal depicts each final trunk group within a respective switch by a respective graphic element having a respective non-alphanumeric characteristic for identifying a plurality of ranges of blocking values;
- a web server accessible to a user via a web browser for displaying said network portrayal and said switch portrayals as said plurality of graphic elements on a plurality of web pages; and
- a memory for storing a history of said blocking values, wherein said portrayals represent a time period having a worst grade of service within a predetermined time span;
- wherein said web page generator further generates a worst trunk group portrayal listing a plurality of final trunk groups having a highest blocking percentage of all final trunk groups during said predetermined time span.

17. The system of claim 16 wherein said web page generator further generates a trunk group history portrayal for each of said final trunk groups depicting a history of trunk performance parameters over said predetermined time span.

18. The system of claim 16 wherein said data gathering application is compatible with mobile switches of a wireless cellular network.

* * * * *